(12) United States Patent
Jepsen et al.

(10) Patent No.: US 6,307,607 B1
(45) Date of Patent: Oct. 23, 2001

(54) REFLECTIVE LIQUID CRYSTAL DISPLAY WITH INTEGRATED COMPENSATION FOR SKEW ANGLE ROTATION AND BIREFRINGENCE EFFECTS

(75) Inventors: Mary Lou Jepsen, San Francisco, CA (US); Sjoerd Stallinga, Eindhoven (NL); Peter J. Janssen, Scarborough; Jeffrey A. Shimizu, Peekskill, both of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/469,456

(22) Filed: Dec. 21, 1999

(51) Int. Cl.[7] .................................................. G02F 1/1335
(52) U.S. Cl. ............................. 349/117; 349/5; 349/119; 349/120
(58) Field of Search .................................. 349/117, 121, 349/5, 119, 120

(56) References Cited

U.S. PATENT DOCUMENTS

| | | | |
|---|---|---|---|
| 5,119,220 | * 6/1992 | Narita et al. | 359/73 |
| 5,327,270 | * 7/1994 | Miyatake | 359/63 |
| 5,490,003 | * 2/1996 | Van Spring | 359/63 |
| 5,658,490 | * 8/1997 | Sharp et al. | 252/299.01 |
| 5,777,709 | * 7/1998 | Xu | 349/120 |
| 5,829,852 | 11/1999 | Jung | 353/20 |
| 5,940,155 | * 8/1999 | Yang et al. | 349/120 |
| 5,978,055 | * 11/1999 | Van De Wittle et al. | 349/119 |
| 5,990,997 | * 11/1999 | Jones et al. | 349/120 |
| 6,057,901 | * 5/2000 | Xu | 349/121 |
| 6,078,374 | * 6/2000 | Sharp et al. | 349/119 |
| 6,094,246 | * 7/2000 | Wong et al. | 349/99 |
| 6,144,432 | * 11/2000 | Hatanaka et al. | 349/119 |
| 6,144,433 | * 11/2000 | Tillin et al. | 349/123 |

FOREIGN PATENT DOCUMENTS

| | | | |
|---|---|---|---|
| 0390511 | 10/1990 | (EP) | G03B/21/00 |
| 0898196 | 2/1999 | (EP) | G02F/11/39 |
| 02-37319-A | * 2/1990 | (JP) . | |
| 05-66384-A | * 3/1993 | (JP) . | |
| 07-301794-A | * 11/1995 | (JP) . | |

OTHER PUBLICATIONS

"Projection display throughput: Efficiency of optical transmission and light–source collection" by F. E. Doany et al., in IBM J. Res. Develop. vol. 42 No. 34, pp. 387–399.

* cited by examiner

Primary Examiner—William L. Sikes
Assistant Examiner—Tarifur R. Chowdhury

(57) ABSTRACT

A reflective liquid crystal (R-LCD) display device in which both the residual retardance of an R-LCD and the skew-angle effect of the analyzer may be compensated by a single compensator which has its optical axis oriented at an angle of from 1 to 30 degrees to the plane of polarization of the incident beam, eliminating the need for two separate compensators.

15 Claims, 5 Drawing Sheets

REFLECTIVE LIQUID CRYSTAL DISPLAY WITH INTEGRATED COMPENSATION FOR SKEW ANGLE ROTATION AND BIREFRINGENCE EFFECTS

BACKGROUND OF THE INVENTION

This invention relates to reflective liquid crystal displays (R-LCDs), and more particularly relates to compensation for the residual retardation in the driven state of the liquid crystal (LC), as well as compensation for the so-called "skew-angle" effect.

R-LCDs are attractive for use as the light modulators in projection display systems, due in part to the ability to integrate the pixel switches and interconnecting circuitry and components on a silicon substrate, below the reflective layer, enabling the high pixel density needed for high resolution displays.

R-LCDs operating in the "twisted nematic" (TN) mode have orientation layers in contact with the LC layer with preferred directions of orientation usually set at an angle of from 30 to 90 degrees to one another. The nematic LC molecules next to these orientation layers tend to orient themselves with their long axes (directors) parallel to the orientation direction. This orientation distorts the normally mutually parallel relationship of the directors, forcing the directors in the bulk of the LC molecules between the oriented LC molecules to twist 45 degrees.

Plane-polarized light striking the transmissive side of the R-LCD normal to the plane of the LC layer and parallel to the director orientation, is rotated a number of degrees as it passes to the reflective side. In some modes, for example the 45 degree twist mode, upon reflection, the light is circularly polarized, and upon leaving the liquid crystal, the light has undergone a net rotation of 90 degrees.

Light modulation is achieved by the application of an electric field, under the influence of which the bulk of the LC molecules tend to untwist, to a degree dependent on the strength of the field. In the extreme untwisted state, the polarized light traverses the R-LCD with substantially no rotation. An analyzer such as a polarizing beam splitter (PBS) at the transmissive side of the R-LCD transmits more or less of the polarized light in accordance with its degree of rotation.

Unfortunately, the applied field, even in the extreme state, is insufficient to influence the LC molecules in regions next to the orientation layers. These so-called "dead layers" impart a residual birefringence or retardation to the R-LCD, which changes the plane polarized light to slightly elliptically polarized light, the minor component of which leaks through the analyzer, thus decreasing the contrast of the display.

U.S. patent application Ser. No. 09/097969 filed Jun. 16, 1998, and assigned to the present assignee, describes a compensator which compensates for the residual retardation of the R-LCD in the driven state. This compensator has a retardance $(d\Delta n)_R$ of about 20–100 nm for the normally-white variant (normally-white means going from bright to dark as the driving voltage increases), and about 150–250 nm for the normally-black variant (normally-black means going from dark to bright as the driving voltage increases). The compensator is oriented with its optical axis between $(80+\phi/2)$ degrees and $(100+\phi)$ degrees with the liquid crystal orientation at the transmissive side of the LCD, where $\phi$ is the twist angle. For $\phi=45$ degrees, the range 102.5–145 degrees. Such an orientation results in the cancellation of the minor component of the elliptically polarized light exiting from the R-LCD.

In cases in which the illumination beam is not collimated, but is cone-shaped, for example, convergent from the source onto the R-LCD, and the analyzer is oriented at an angle to the polarizer, there will be light leakage through the analyzer, causing a reduction in contrast of the display. This leakage is known as the "skew-angle" effect. This effect is worse in the case of a polarizing beam splitter, in which the embedded analyzer is designed to have high transmittance and work well over a narrow range of cone angles.

U.S. Pat. No. 5,327,270 and PCT International publication WO 95/13561 address the skew-angle effect by introducing a second compensator in the form of a quarter wave plate oriented with its optical axis either parallel to or perpendicular to the plane of the incident polarization.

OBJECTS AND SUMMARY OF THE INVENTION

It is an object of the present invention to provide a single retardation compensator (or "compensator") which compensates for both the residual retardance of the R-LCD and for the skew-angle effect of the analyzer in an R-LCD display.

In accordance with the invention, it has been discovered that both the residual retardance of the R-LCD and the skew-angle effect of the analyzer in an R-LCD display may be compensated by a single compensator which has its optical axis oriented at an angle within the range of from about ±1 to ±30 degrees, and preferably from about ±3 to ±15 degrees, to the plane of polarization of the incident beam.

The liquid crystal preferably has a twist angle within the range of about 30 to 55 degrees, and a retardance $(d\Delta n)_{LC}$ within the range of from about 170 to 250 nm, and the compensator preferably has a retardance $(d\Delta n)_c$ within the range of from about 90 to 140 nm.

DESCRIPTION OF THE PREFERRED EMBODIMENTS

Figure 1:
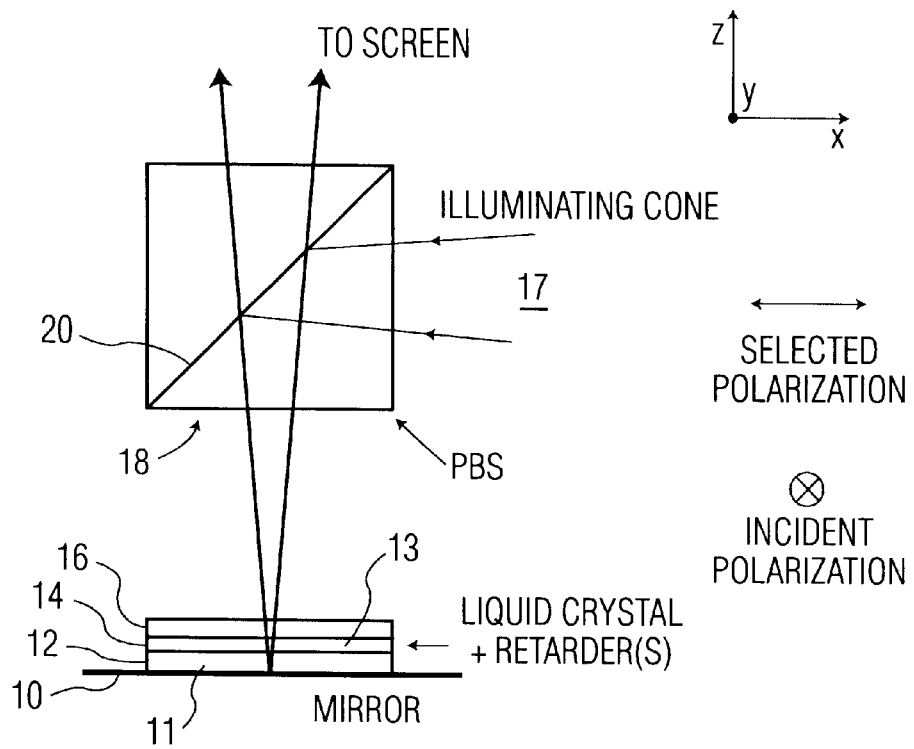
FIG. 1 shows a typical R-LCD display arrangement of the prior art having two compensators.

FIG. 1 shows a typical R-LCD display arrangement of the prior art having two compensators. R-LCD 12 has a front transmissive surface 13, a rear reflective surface 10, and a liquid crystal material 11 between these surfaces. Orientation layers on the insides of the front 13 and rear 10 surfaces, not shown, orient the liquid crystal material 11 in a known manner.

A converging beam of plane polarized light 17 enters a polarizing beam splitter 18 from the right, and is reflected by analyzer 20 onto R-LCD 12. This incident light has a polarization direction along the y axis (normal to the plane of the drawing figure). As the beam 17 travels through the liquid crystal material 11, the polarization direction changes depending on the state of twist of the liquid crystal molecules. Light whose polarization direction is rotated 90 degrees, so that its direction is along the x axis (parallel to the plane of the drawing figure), is substantially transmitted by analyzer 20 to the display screen, not shown. Less light is transmitted by analyzer 20 as the degree of twist of the LC molecules lessens under the influence of an applied field, and the degree of rotation of the polarization direction (in the x-y plane) consequently also lessens.

Under an extreme field state, the LC molecules are substantially untwisted, except for a residual twist in dead layers near the surfaces of the R-LCD, giving rise to a residual birefringence and some light leakage through the analyzer 20 in the dark state, reducing contrast of the display. Compensator 14 is designed to compensate for this residual birefringence. An additional component of light leaks through analyzer 20 due to the skew angle effect of the converging beam 17. Compensator 16 is designed to compensate for this effect.

Figure 2:
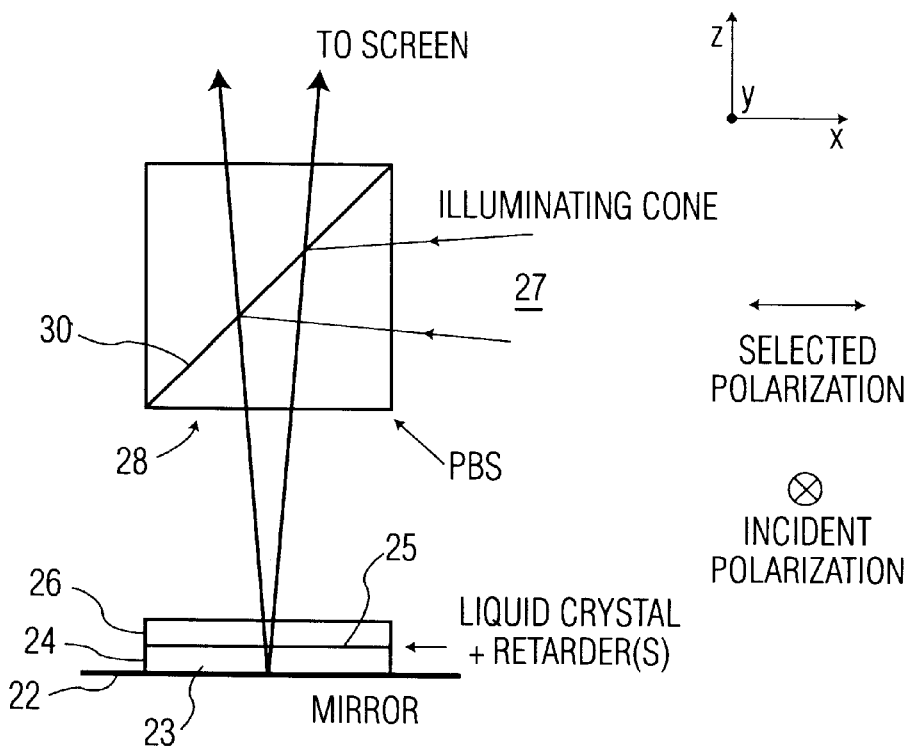
FIG. 2 shows one embodiment of an R-LCD display arrangement the invention having a single, integrated compensator.

FIG. 2 is similar to FIG. 1, showing R-LCD 24 having a front transmissive surface 25, a rear reflective surface 22, and a liquid crystal material 23 between these surfaces. Orientation layers on the insides of the front 25 and rear 22 surfaces, not shown, orient the liquid crystal material 23 in a known manner. PBS 28 directs beam 27 and analyzes it via analyzer 30 in the manner described above. However, in accordance with the teachings of the invention, a single integrated compensator 26 performs the functions of both the compensators 14 and 16 of the prior art device.

The combination of the R-LCD 24 and the integrated compensator 26 in accordance with the teachings of this invention must satisfy two requirements. First, the combination must effectively behave as a quarter wave plate with optical axis along the x or y axis in the driven state of the LC. Second, the combination must effectively behave as a quarter wave plate with optical axis at 45 degrees with the x and y axis in the non-driven state. When these requirements are satisfied, the light passing through the analyzer is minimized for the driven state and maximized for the non-driven state, i.e., both contrast and brightness are optimized.

Figure 3:
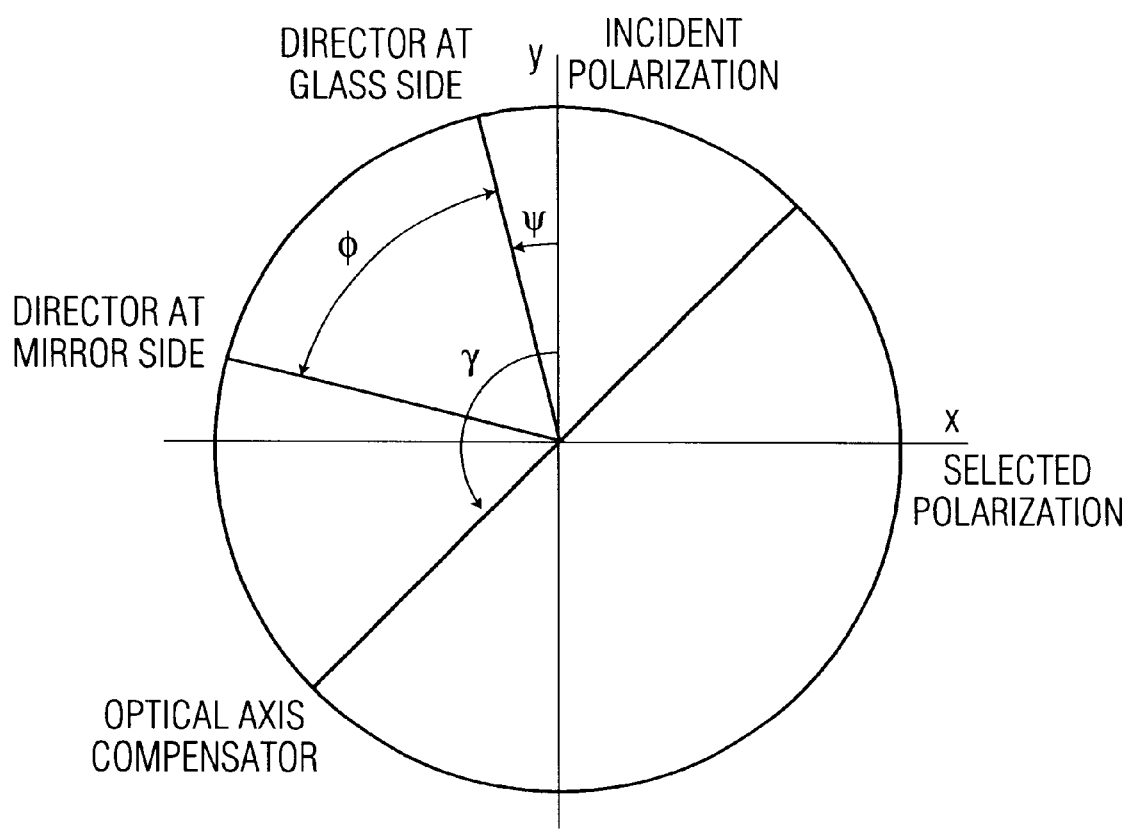
FIG. 3 is a top view of an R-LCD showing the relative angular positions of: the planes of polarization and the directors, respectively, at the incident and reflected sides; and the optical axis of an integrated compensator in accordance with the invention.

The two requirements were used to calculate the LC retardance $(d\Delta n)_{LC}$ (product of thickness d of the LC cell and the birefringence $\Delta n$ of the LC cell), the angle between the front (transmission) side director and the incident polarization $\Psi$, the retardance of the compensator $(d\Delta n)_c$, and the angle between the optical axis of the compensator and the incident polarization $\gamma$ as a function of the LC twist angle $\phi$. FIG. 3 is a geometric construct projected onto a top view of an R-LCD illustrating the relationships of these various angles with respect to x and y axes.

Figure 4A:
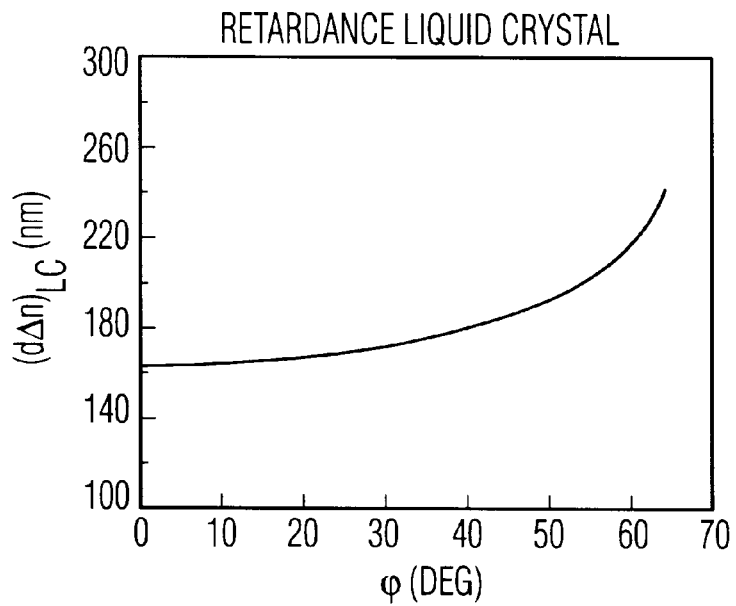
FIGS. 4a and 4b graphically illustrate the relationship between twist angle and retardance of the LC material and the compensator, respectively, for a light wavelength of 550 nm.
Figure 4B:
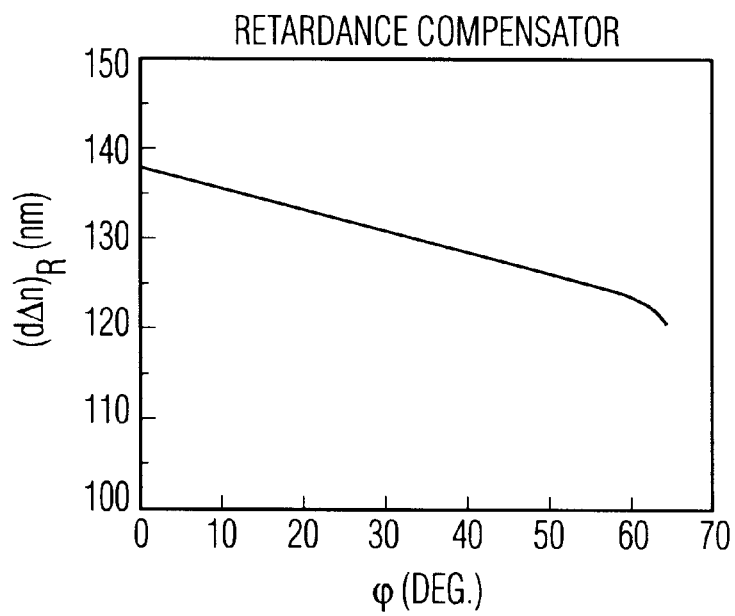
Figure 4C:
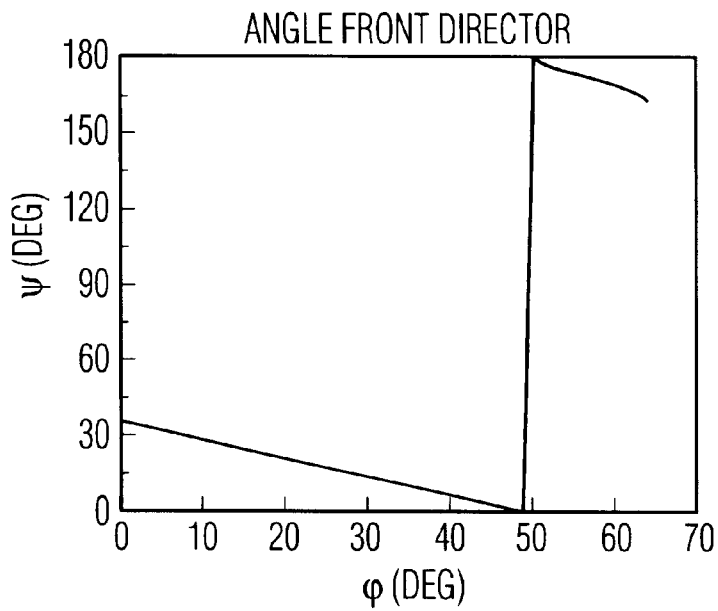
FIGS. 4c and 4d graphically illustrate the relationship between twist angle and the angles of the front director and the optical axis of the compensator, respectively, for a light wavelength of 550 nm.
Figure 4D:
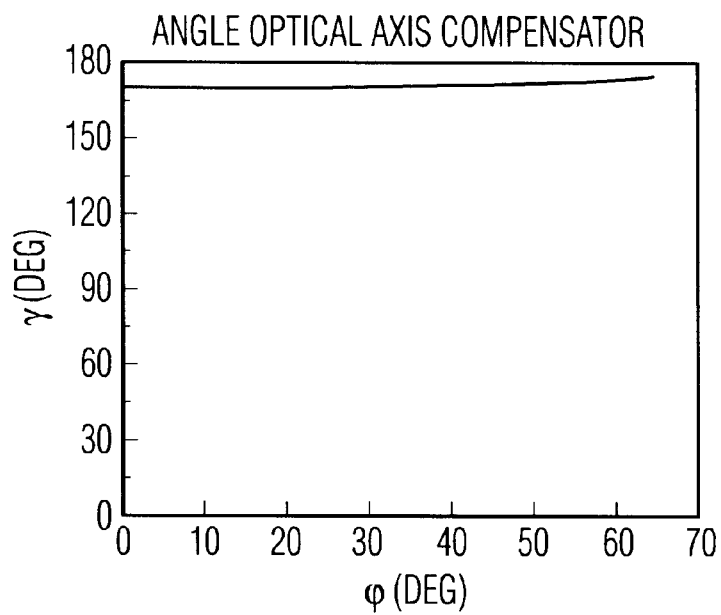

The calculations were made for a light wavelength of 550 nm and standard LC parameters and driving voltages. FIGS. 4a and 4b plot the calculated values of retardance of the LC and compensator, respectively, as a function of twist angle, while FIGS. 4c and 4d plot the calculated values of the angle of the director and the optical axis of the compensator, respectively, as a function of twist angle. Of particular relevance are the values between the twist angles of 30 and 55 degrees, as this is a preferred range of twist angles, as taught and claimed in copending patent application Ser. No. 09/097969 filed Jun. 16, 1998, the entire contents of which are incorporated herein by reference.

As can be seen from these figures, between the twist angles of 30 and 55 degrees, the retardance of the LC ranges between about 170 and 200 nm, the retardance of the compensator ranges between about 125 and 133 nm, the angle between the front director and the plane of the incident polarization ranges from about +15 to −5 degrees, while the angle of the optical axis of the compensator and the plane of the incident polarization ranges from about −5 to −10 degrees. These parameters will optimize both the contrast and brightness of an R-LCD projector using a single compensator as an integrated compensator in the manner described herein.

Figure 5:
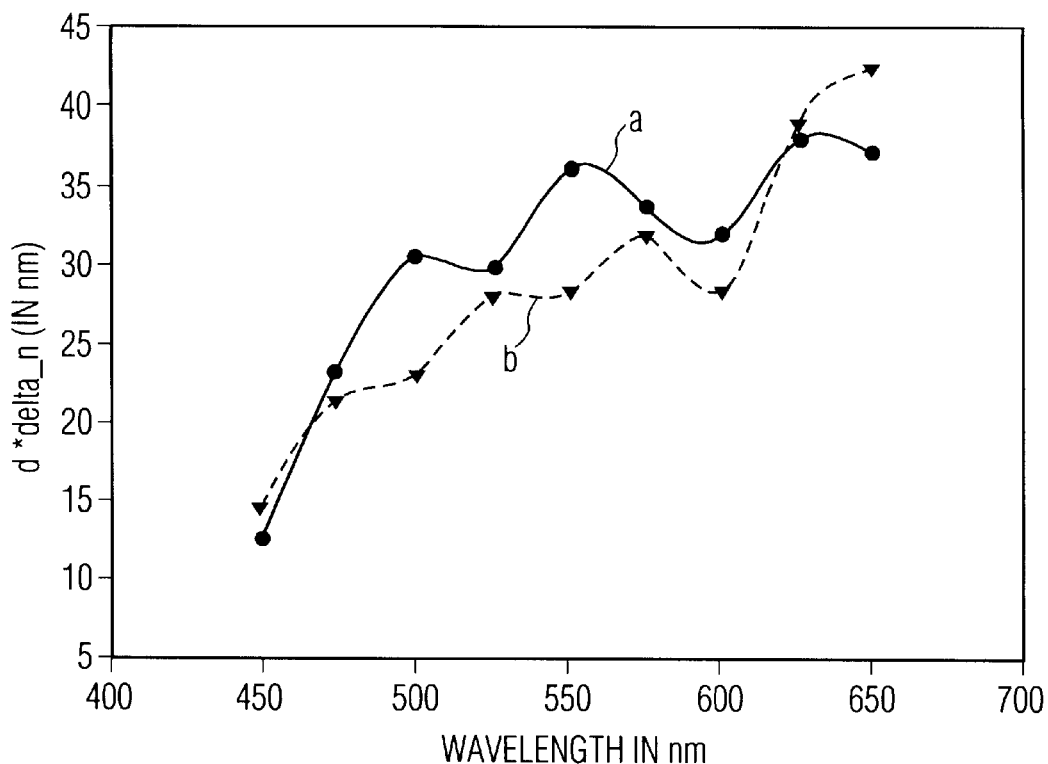
FIG. 5 graphically compares the compensation required for an R-LCD test cell with the actual compensation achieved for a compensator having its optical axis rotated 4 degrees from the plane of polarization of the incident polarization.

FIG. 5 is a plot of retardance (d$\Delta$n) in nanometers (nm) versus wavelength of incident light, also in nanometers (nm) for: (a) the measured compensation to achieve a dark state in an R-LCD test cell; and (b) the measured compensation for the combination of the test cell and a compensator having its optical axis rotated 4 degrees from the plane of polarization of the incident polarization. The test cell had a twist angle of 45 degrees, a cell thickness of 1 micron, and was illuminated with converging light having a cone angle of 12 degrees. The compensator had a retardance $(d\Delta n)_c$ of 108 nm. As can be seen, the rotated compensator compensated well for the retardance of the LC cell.

Figure 6:
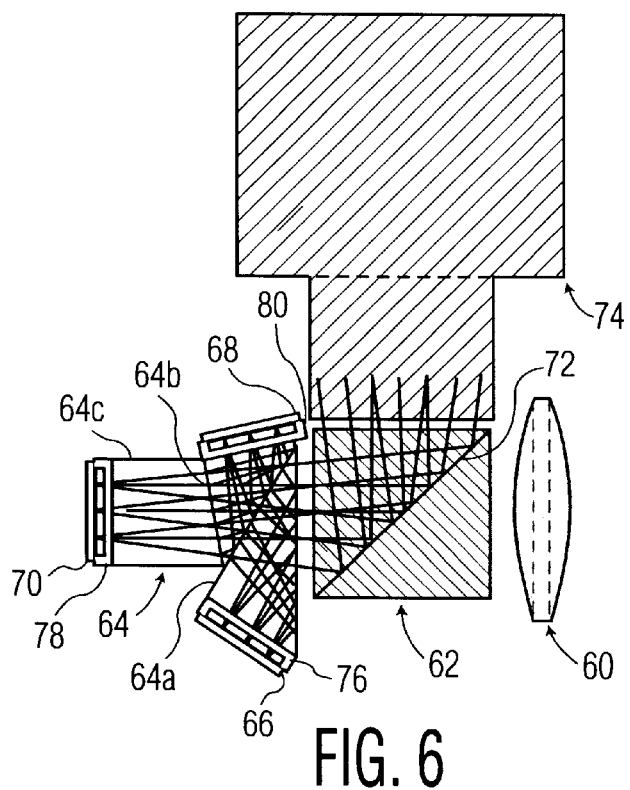
FIG. 6 is diagram of a color projector employing three R-LCDs, each R-LCD employing an integrated compensator in accordance with the invention.

FIG. 6 is a diagram of a color projector employing three R-LCDs, one for each of the primary colors red, green and blue. Plane polarized light enters lens 60 from the right, passes through PBS 62 into compound prism 64 (which splits the light into red, green and blue components in the manner described in IBM J. RES. DEVELOP., VOL. 42, NO. ¾, MAY/JULY 1998, the contents of which are incorporated herein by reference) and directs the components onto R-LCDs 66, 68 and 70, respectively. The light rays are convergent onto the R-LCDs, from which they are reflected back into the compound prism 64. Light rotated less than 90 degrees is reflected by the analyzer 72 of the PBS into projection lens 74.

In accordance with the invention, each of the R-LCDs (66, 68 and 70) have a single compensator (76, 78 and 80, respectively) which compensates both for the residual retardation of the LC material and for the "skew angle effect", contributing to the brightness and contrast of the projected image. Each R-LCD/compensator combination comprises an R-LCD module.

The invention has been described in terms of a limited number of embodiments. Other embodiments, variations of embodiments and art-recognized equivalents will become apparent to those skilled in the art, and are intended to be encompassed within the scope of the invention, as set forth in the appended claims.

What is claimed is:

1. A reflective liquid crystal display module comprising a reflective liquid crystal display, and an integrated compensator, the liquid crystal display comprising a front transmissive surface, a rear reflective surface, and a layer of liquid crystal material in contact with orientation layers on the front and rear surfaces, the liquid crystal having director molecules near the front and rear surfaces with a preferred direction of orientation determined by the orientation layers, the integrated compensator having its optical axis oriented at an angle within the range of from about 1 to 30 degrees with respect to the preferred direction of the front director molecules, and able to compensate for both residual birefringence of the liquid crystal display and for skew angle effect.

2. The module of claim 1 in which the integrated compensator has its optical axis oriented at an angle within the range of from about 3 to 15 degrees with respect to the preferred direction of the front director molecules.

3. The module of claim 1 in which the liquid crystal has a twist angle within the range of about 30 to 55 degrees.

4. The module of claim 1 in which the liquid crystal has a retardance within the range of about 170 to 250 nm.

5. The module of claim 1 in which the integrated compensator has a retardance within the range of from about 90 to 140 nm.

6. A display system comprising:
   (a) at least one reflective liquid crystal display module comprising a reflective liquid crystal display, and an integrated compensator, the liquid crystal display comprising a front transmissive surface, a rear reflective surface, and a layer of liquid crystal material in contact with orientation layers on the front and rear surfaces, the liquid crystal having director molecules near the front and rear surfaces with a preferred direction of orientation determined by the orientation layers, the integrated compensator having its optical axis oriented at an angle within the range of from about 1 to 30 degrees with respect to the preferred direction of the front director molecules, and able to compensate for both residual birefringence of the liquid crystal display and for skew angle effect;
   (b) means for directing plane polarized light onto the reflective liquid crystal display; and
   (c) means for analyzing the light reflected by the reflective liquid crystal display.

7. The display device of claim 6 in which the means for directing plane polarized light onto the reflective liquid crystal display and the means for analyzing the light reflected by the reflective liquid crystal display comprise a polarizing beam splitter.

8. The display device of claim 6 further including means for projecting an analyzed beam onto a display screen.

9. The display device of claim 6 in which there are three R-LCD modules.

10. The display device of claim 9 in which means are provided for: splitting a single plane polarized beam into three beams; directing the three beams onto the three R-LCDs; and directing the beams reflected from the R-LCDs along a common path to the polarizing beam splitter.

11. The display device of claim 10 in which the means comprises a compound prism.

12. The display device of claim 6 in which the integrated compensator has its optical axis oriented at an angle within the range of from about 3 to 15 degrees with respect to the preferred direction of the front director molecules.

13. The display device of claim 6 in which the liquid crystal has a twist angle within the range of about 30 to 55 degrees.

14. The display device of claim 6 in which the liquid crystal has a retardance within the range of about 170 to 250 nm.

15. The display device of claim 6 in which the integrated compensator has a retardance within the range of from about 90 to 140 nm.

* * * * *